United States Patent
Sun (10) Patent No.: US 11,212,767 B2
(45) Date of Patent: Dec. 28, 2021

(54) NETWORK REGISTRATION OF TERMINAL, AND METHODS AND APPARATUSES FOR TRANSMISSION OF NETWORK SELECTION PARAMETER

(71) Applicant: BEIJING XIAOMI MOBILE SOFTWARE CO., LTD., Beijing (CN)

(72) Inventor: Daliang Sun, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/915,619

(22) Filed: Jun. 29, 2020

(65) Prior Publication Data
US 2021/0250889 A1 Aug. 12, 2021

(30) Foreign Application Priority Data

Feb. 12, 2020 (CN) .......................... 202010089323.8

(51) Int. Cl.
*H04W 60/00* (2009.01)
*H04W 4/029* (2018.01)

(52) U.S. Cl.
CPC .......... *H04W 60/00* (2013.01); *H04W 4/029* (2018.02)

(58) Field of Classification Search
None
See application file for complete search history.

(56) References Cited

U.S. PATENT DOCUMENTS

| | | | |
|---|---|---|---|
| 9,628,359 B1 | 4/2017 | Jain et al. | |
| 2013/0012291 A1 | 5/2013 | Singh et al. | |
| 2017/0222901 A1* | 8/2017 | Jain | ............ G06F 16/9537 |
| 2019/0200209 A1 | 6/2019 | Velev et al. | |

FOREIGN PATENT DOCUMENTS

| | | |
|---|---|---|
| CN | 105898839 A | 8/2016 |
| CN | 106028279 A | 10/2016 |
| CN | 106231655 A | 12/2016 |
| CN | 107666697 A | 2/2018 |
| CN | 110248357 A | 9/2019 |
| WO | WO 2017114326 A1 | 7/2017 |

OTHER PUBLICATIONS

Extended European Search Report dated Jan. 14, 2021 in corresponding European Patent Application No. 20188430.1, 11 pages.
First Office Action issued in corresponding Chinese Patent Application No. 202010089323.8, dated Aug. 25, 2021 (with English translation) (15 pages).

* cited by examiner

*Primary Examiner* — Adolf Dsouza
(74) *Attorney, Agent, or Firm* — Oblon, McClelland, Maier & Neustadt, L.L.P.

(57) ABSTRACT

A network registration method is applied to a terminal and can includes that a signal parameter of a network position where the terminal is presently located is acquired, and the network position and the signal parameter are reported to a server, the network position and the signal parameter being configured to determine a network selection parameter. The method can further include that the network selection parameter is received from the server, and network registration is performed according to the network selection parameter.

16 Claims, 10 Drawing Sheets

NETWORK REGISTRATION OF TERMINAL, AND METHODS AND APPARATUSES FOR TRANSMISSION OF NETWORK SELECTION PARAMETER

CROSS-REFERENCE TO RELATED APPLICATION

This application is based upon and claims priority to Chinese Patent Application No. 202010089323.8, filed on Feb. 12, 2020, the entire contents of which are incorporated herein by reference.

TECHNICAL FIELD

The present disclosure relates, but is not limited, to the technical field of wireless communication, and particularly, to a method and apparatus for network registration, a method and apparatus for transmitting a network selection parameter, a communication device and a storage medium.

BACKGROUND

Along with the development of communication technologies, multiple types of cellular mobile communication networks emerge. Networks of different types adopt different communication systems and follow different communication protocols. For example, 5th Generation (5G) mobile communication networks are divided into Standalone (SA) and Non-Standalone (NSA) networks. A 5G network is a next-generation communication network of 4th Generation (4G). For adaptation to the development of network technologies, some terminals can support multiple types of mobile communication networks. In such a case, due to a limitation of a hardware capability of a terminal or for a purpose of reducing power consumption, terminals may select only one or few of the multiple types of networks for registration at a moment. However, there is no solution for how to optimize network selection to ensure the communication quality of terminals or reduce ping-pong network selection.

SUMMARY

A first aspect of the present disclosure provides a method for network registration that can be implemented by a terminal. The method can include that a signal parameter of a network position where the terminal is presently located is acquired, the network position and the signal parameter are reported to a server, the network position and the signal parameter being configured to determine a network selection parameter, the network selection parameter is received from the server, and network registration is performed according to the network selection parameter.

A second aspect of the present disclosure provides a method for transmitting a network selection parameter that can be implemented by a server. The method can include that network positions and signal parameters are received from one or more terminals, and network selection parameters are transmitted to the one or more terminals respectively according to the network positions and the signal parameters.

A third aspect of the embodiments of the present application provides a communication device, which may include a transceiver, a processor, and a memory that is configured to store instructions executable by the processor. The processor may be connected with the transceiver and the memory respectively and configured to execute the instructions to implement the method provided in any embodiment of the first aspect or the second aspect.

A fourth aspect of the present disclosure provides a computer storage medium, which may have stored instructions, the instructions being executable by a processor to implement the method provided in any embodiment of the first aspect or the second aspect.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate exemplary embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

The terms used in the present disclosure are for describing particular embodiments only, and are not intended to limit the present disclosure. The singular forms "a/an", "the" and "this" used in the present disclosure and the appended claims are also intended to include the plural forms unless the context clearly indicates other meanings. It is to be understood that the term "and/or" as used herein refers to and includes any or all possible combinations of one or more associated listed items.

It is to be understood that although the terms first, second, third, etc. may be used to describe various information in the present disclosure, the information should not be limited to these terms. The terms are only used to distinguish the same type of information from each other. For example, without departing from the scope of the present disclosure, the first information may also be referred to as second information, and similarly, the second information may also be referred to as first information. Depending on the context, the word "if" as used herein may be interpreted as "during" or "when" or "in response to determination."

Figure 1:
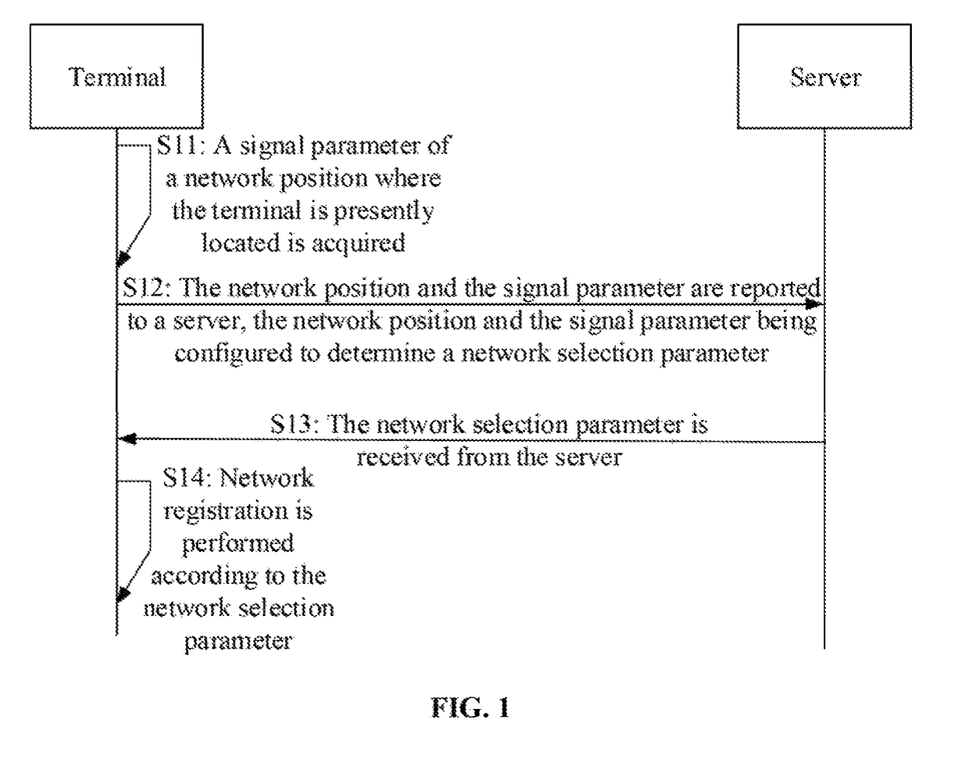
FIG. 1 is a flowchart showing a network registration method according to an exemplary embodiment.

As shown in FIG. 1, an embodiment provides a network registration method, which is applied to a terminal and includes the following operations.

In S11, a signal parameter of a network position where the terminal is presently located is acquired.

In S12, the network position and the signal parameter are reported to a server, the network position and the signal parameter being configured to determine a network selection parameter.

In S13, the network selection parameter is received from the server.

In S14, network registration is performed according to the network selection parameter.

In some embodiments, the terminal may be various types of terminals, for example, an ordinary terminal and an Internet of things terminal. The ordinary terminal may include a mobile phone, a pad, or a wearable device. The Internet of things terminal may include, but not limited to, a smart home device and/or a smart office device. In some embodiments, the terminal may further include a carry-on terminal and/or a vehicle terminal.

The server may be a cloud server. Herein, the server is different from a base station. For example, the server may be various types of devices capable of accessing a network through various connections and establishing communication with the terminal.

In some embodiments, the server may include, but not limited to, a terminal server provided by a manufacturer of the terminal, an operating company server of an operating company of a cellular mobile communication network, and a communication server for providing third-party communication service.

The network position may include any information identifying a network to which a geographical position of the terminal belongs, for example, a cell identifier of a cell where the terminal presently resides. In some embodiments, the network position may include a network identifier of a network practically accessed by the terminal and a specific position of the accessed network.

The signal parameter reported by the terminal may include various index parameters of a wireless signal at the network position where the terminal is presently located. For example, the signal parameter may include, but not limited to, a measured value of signal quality of an accessed network or another network that can be measured after the terminal accesses the network. The measured value may include, but not limited to, receiving power, receiving strength or a signal to interference plus noise ratio, and the like, For example, the measured value may be Reference Signal Receiving Power (RSRP), a Received Signal Strength Indicator (RSSI), or Reference Signal Receiving Quality (RSRQ).

A great number of terminals and terminals at different positions may report network positions and signal parameters to the server, and then the server may transmit a network selection parameter suitable for a present network position of a terminal therein to the terminal.

The network selection parameter may include, but not limited to, at least one of: a quality threshold for network selection; alternative networks for network selection; a target network for network selection; priorities of various types of networks for network selection; indication information about existence of a first-type network at a corresponding position; and statistical information about signal quality of a first-type network at a corresponding position.

The statistical information may include, but not limited to an average value of the signal quality, a maximum value of the signal quality, a minimum value of the signal quality, a capacity of the first-type network and/or a bandwidth of the first-type network, and the like.

In the embodiment of the present application, networks available for network selection and registration of the terminal may include, but not limited to a 3rd generation (3G) network, a 4G network and a 5G network, and the like.

Furthermore, for enabling the terminal to select a network capable of providing better communication service, the network selection parameter may be a network selection parameter of a certain type of network. For example, the network selection parameter may be a network selection parameter of a 5G network.

In some embodiments, alternative networks for network selection of the terminal may be divided into two types, i.e., first-type networks and second-type networks respectively. For example, the first-type network may be a 5G network. The second-type network may be any network other than the first-type network. For example, the second-type network may be a 4G network or a 3G network. In some embodiments, when the first-type network is a 4G network, the second-type network may be a 3G network or a 2nd generation (2G) network. The 5G network may include an SA 5G network or an NSA 5G network.

The terminal, after selecting a network, may be registered on a network and/or access a cell of the network, thereby residing in the network. For example, the terminal, when selecting to access the 5G network or the 4G network for residence according to the network selection parameter of the 5G network, may select to be registered on and/or access a 5G cell or a 4G cell. Herein, the first-type network may be a network more advanced than the second-type network. Such an advancement may enable performance parameters of a bandwidth, rate, quality of service or the like that can be provided by an existing network to get better.

Accordingly, when the terminal is turned on and performs network selection or the terminal selects a certain network after movement, network selection may be implemented based on the network selection parameter formed by a great amount of statistical data. Some advantages can be got, including that a network selection latency is short, a speed is high and a selected network can provide best or satisfied quality of service for the terminal at the present position.

Figure 2:
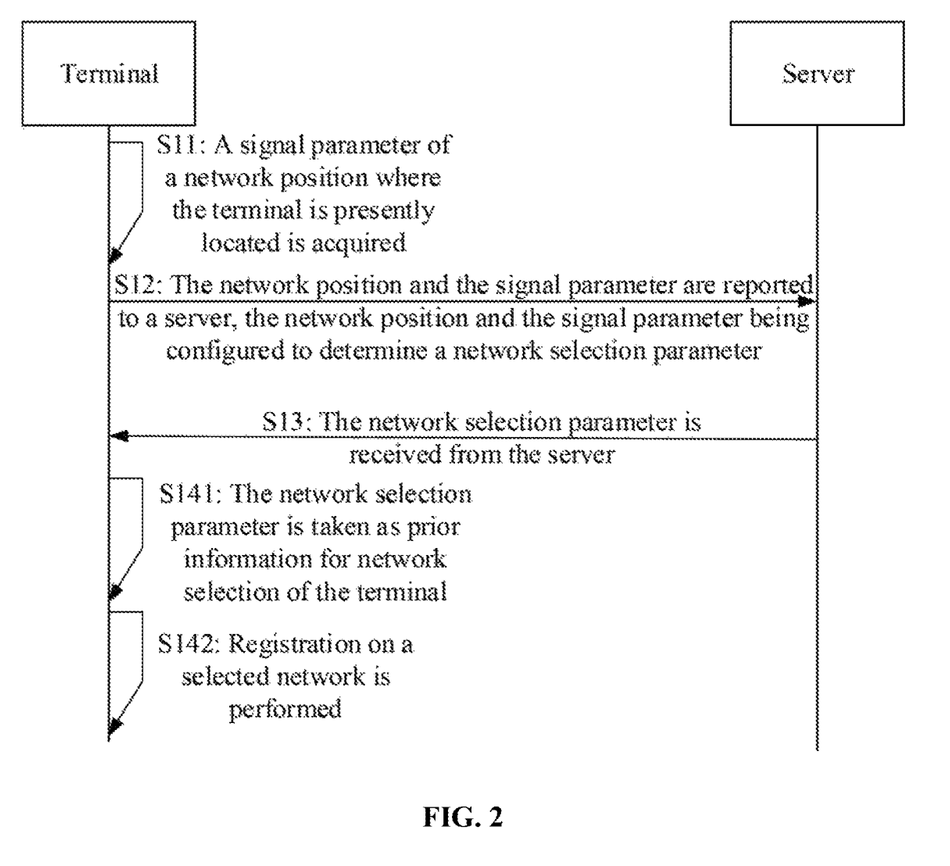
FIG. 2 is a flowchart showing a network registration method according to an exemplary embodiment.

In some embodiments, as shown in FIG. 2, S14 may include the following operations. In S141, the network selection parameter is taken as prior information for network selection of the terminal. In S142, registration on a selected network is performed.

In the related technical solution, the prior information may be generated according to a record that the terminal successfully resides in the network last time. In a situation that the terminal, after being turned off, is turned on again and performs network registration according to the prior information, the network indicated by the prior information may be preferably selected for registration.

In the embodiment of the present application, the network selection parameter transmitted by the server may be directly taken as the prior information for network selection of the terminal. In such a manner, the terminal, after being turned on again, may perform network selection and registration according to the network selection parameter and, when failing in registration, may perform network searching or consider to reside in another network, so that a long registration latency caused by network searching and the like can be shortened, and the network registration efficiency of the terminal is improved.

In some other embodiments, the network selection parameter may be not directly taken as the prior information for network selection of the terminal but is taken as the prior information for network selection of the terminal under the condition that no prior information is stored in the terminal. In a case that the prior information is locally stored in the terminal, when the terminal, after being turned off, is turned on again and performs network registration, network registration may be performed according to the prior information at first; and in case of failure, network registration may be performed according to the network selection parameter. The network selection parameter is not limited to being directly taken as the prior information for network registration.

In some embodiments, S141 may include that, when the network selection parameter is taken as the prior information, a highest network selection priority is configured for a target network indicated by the network selection parameter for network registration of the terminal.

Networks determined in different manners in the terminal may have different priorities. For example, the highest priority may be configured for the target network indicated by the network selection parameter, so that the network indicated by the network selection parameter may be preferably considered during network selection. Since the network selection parameter is generated based on a great amount of data reported by the terminal, performing network selection and registration according to the network selection parameter has a high registration success probability. Furthermore, network registration can be rapidly completed at a high registration success rate without network searching.

For example, the target network may be the abovementioned first-type network. Specifically, for example, the target network may be the abovementioned 5G network.

Exemplarily, normal network selection and registration of the terminal may include that the process of network registration after the terminal is turned on can include that the network selection is performed based on the prior information, and, when a network selected based on the prior information is unavailable, initial network selection is performed.

Herein, the operation that initial network selection is performed may include that, under the condition that there is no prior information or the network selected based on the prior information is unavailable, the terminal performs network selection according to various networks and priorities of the networks recorded in a user identification module of the terminal.

The user identification module may include, but not limited to, a subscriber identity module (SIM) or a universal subscriber identity module (USIM).

During initial network selection, whether a home public land mobile network (PLMN) (HPLMN) with a high priority or an equivalent home PLMN (EHPLMN) with a highest priority is recorded in the user identification module or not may be judged. When the HPLMN or the EHPLMN is recorded in the user identification module, the HPLMN or the EHPLMN may be selected. When the HPLMN or the EHPLMN is not recorded in the user identification module, a specified PLMN and/or a network corresponding to a radio access technology (RAT) may be selected for registration according to a priority of each PLMN and/or RAT specified by a user input. When there is no PLMN and/or network corresponding to the RAT specified by the user input, a network may be selected for access according to priorities of PLMNs and/or networks corresponding to RATS specified by an operating company. When there is no PLMN and RAT specified by the operating company, a network with signal quality higher than a signal threshold may be selected for registration according to signal quality of networks measured by the terminal. In the embodiment of the present application, the signal threshold may include, but not limited to, −110 dbm. For example, sequencing of signal quality may be performed from high to low, and when the signal quality of multiple PLMNs is higher than the signal threshold, the PLMN with the highest signal quality may be selected for access.

After the network is selected, the terminal may be required to reside in a suitable cell and perform network registration. After registration (also called attach) is successfully completed, the PLMN selected by the user may be notified by a protocol stack. If no optional network is selected, the terminal may enter a "No Service" state and, after finding an optional network, may retry for registration. When there are multiple optional networks but the terminal fails in trying for registration in each network because a registration region (or a roaming region) is banned, the terminal may select a network with a highest priority and enter a "Limited Service" state.

In some embodiments, the first-type network may be a 5G network, and the second-type network may be a 4G network. Since 5G operating companies do not achieve complete network coverage in 2019 and the overall network deployment cost of 5G networks is high, network deployment of the 5G networks is a gradual coverage process. For a 5G mobile phone (the 5G mobile phone is the abovementioned terminal), the searching time cost of a NSA or SA network is high, and thus the network is unstable. The terminal may receive big data of communication, provided by the server, about a signal parameter of the 5G network to assist the 5G mobile phone in rapidly selecting a suitable network for residence, so that unnecessary network searching time and the number of networks with low residing quality can be reduced, the network searching/residing quality of the 5G network is improved, and the user experience is improved.

Figure 3:
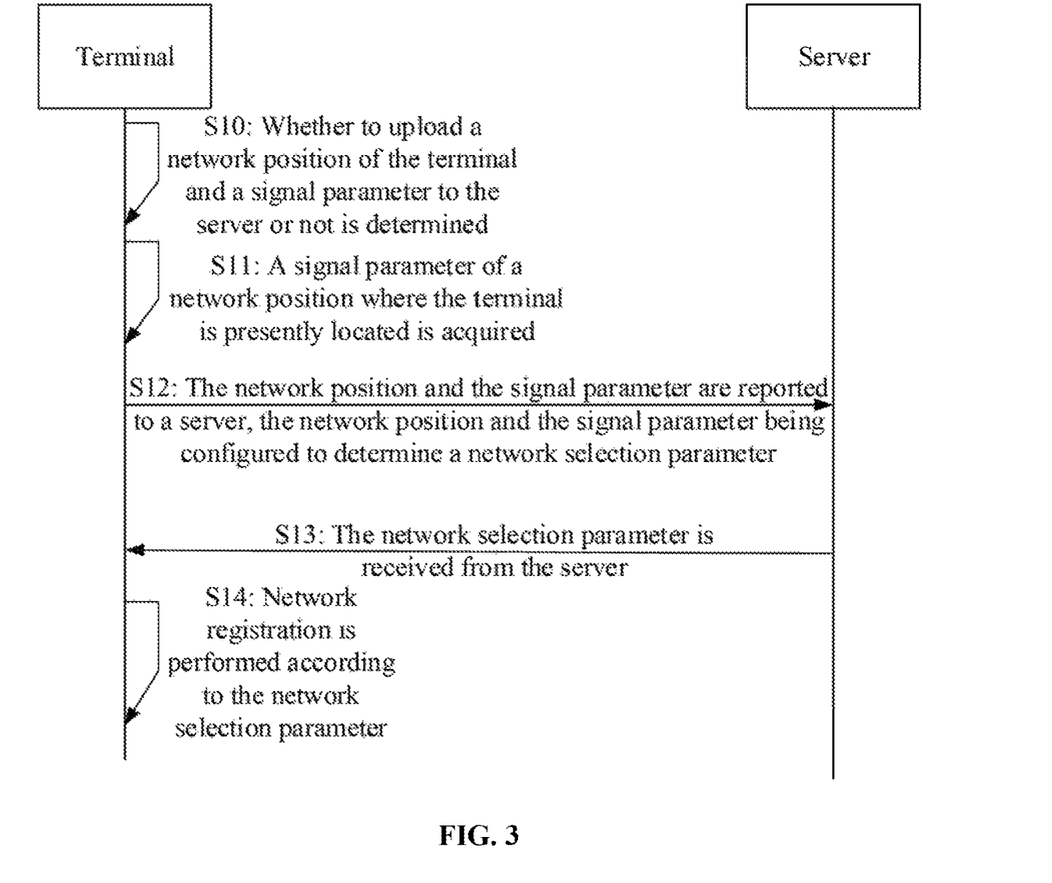
FIG. 3 is a flowchart showing a network registration method according to an exemplary embodiment.

As shown in FIG. 3, the method may further include the following operations.

In S10, whether to upload the network position of the terminal and the signal parameter to the server or not is determined.

S11 may include that, in response to determining to upload the network position of the terminal and the signal parameter to the server, the signal parameter of the network position where the terminal is presently located is acquired.

In an embodiment, S10 may include that, after the terminal is turned on, prompting information is displayed, and whether to upload the network parameter and the signal parameter to the server or not is determined based on a user input corresponding to the prompting information. Specifically, when the user input indicates that reporting is confirmed, the network parameter and the signal parameter may be determined to be uploaded to the server; and when the user input indicates that reporting is canceled, the network parameter and the signal parameter may be determined not to be uploaded to the server.

In some embodiments, S10 may include that, after the terminal is turned on, a predetermined reporting configuration is read, when the reporting configuration indicates reporting, the network parameter and the signal parameter are determined to be uploaded to the server, and, when the reporting configuration indicates no reporting, the network parameter and the signal parameter are determined not to be uploaded to the server.

The reporting configuration may be written into the terminal before delivery of the terminal, or may be written into configuration information in a communication protocol, or may also be automatically generated according to a last user input corresponding to the prompting information.

In a word, whether to upload the network parameter and the signal parameter to the server or not may be determined in multiple manners, not limited to any abovementioned manners.

In some embodiments, the method may further include that, in response to determining to not upload the network position of the terminal and the signal parameter to the server, network searching is started, and network registration is performed based on found networks.

For example, in response to determining to not upload the network position of the terminal and the signal parameter to the server, network registration may be performed according to a normal process in the related art. Specifically, the operation that network registration is performed based on the found networks may include that a network with the highest priority among the found networks is selected for network registration. Network selection and registration may be performed according to a priority of each found network. For example, a network where the terminal is registered last time may have the highest priority. If the network where the terminal is registered last time is not found or is found but unavailable and a network with a high priority is not found or the network with the high priority is unavailable, a network with a next priority may be searched for and registration may be performed based on searching of the network with the next priority until registration succeeds or the networks of all types have been searched for.

For example, S11 may further include that a signal parameter of a 5G network where the terminal is presently located is acquired. S12 may include that a network position of the 5G network where the terminal is located and the signal parameter of the 5G network are reported to the server. Therefore, the terminal, when supporting a 5G technology, may rapidly select the 5G network based on the network parameter transmitted by the server and use the 5G network with higher performance as much as possible.

In the embodiments of the present application, the terminal may periodically or aperiodically report the network parameter and the signal parameter.

In some embodiments, the terminal may periodically or aperiodically receive the network selection parameter transmitted by the server.

In some embodiments, the operation that the network parameter and the signal parameter are reported to the server may include that the network parameter and the signal parameter are periodically reported to the server.

For example, the terminal may report the network parameter and the signal parameter to the server at an interval of a predetermined time length (periodically). For example, the terminal, after being turned on and registered on a network for the first time, may report a network parameter and a signal parameter for the first time, and then periodically report network parameters and signal parameters after first reporting.

In some embodiments, the method may further include that the terminal compares a presently detected network parameter and signal parameter with a historically detected network parameter and signal parameter, and, when a difference between the presently detected network parameter and signal parameter and the historically detected network parameter and signal parameter is greater than a difference threshold, the presently detected network parameter and signal parameter may be reported, otherwise they may be not reported. Therefore, the number of reporting times of the terminal and unnecessary parameters received by the server are reduced, and the data size required to be processed by the server is reduced.

In some embodiments, S13 may include that the network selection parameter is periodically received from the server.

The server may periodically transmit the network selection parameter, and then the terminal is required to select the first-type network or the second-type network for registration according to the network selection parameter received last time during network selection, so that the terminal is not needed to temporally request for the network selection parameter, and the latency caused by requesting for the network selection parameter is reduced. Compared with the condition of no updating after a transmission, periodic transmission has the advantages of reducing the phenomenon that a network selected for residence is not an optimal network when the first-type network or the second-type network is selected for registration based on the network selection parameter, and the network selection quality is improved.

Figure 4:
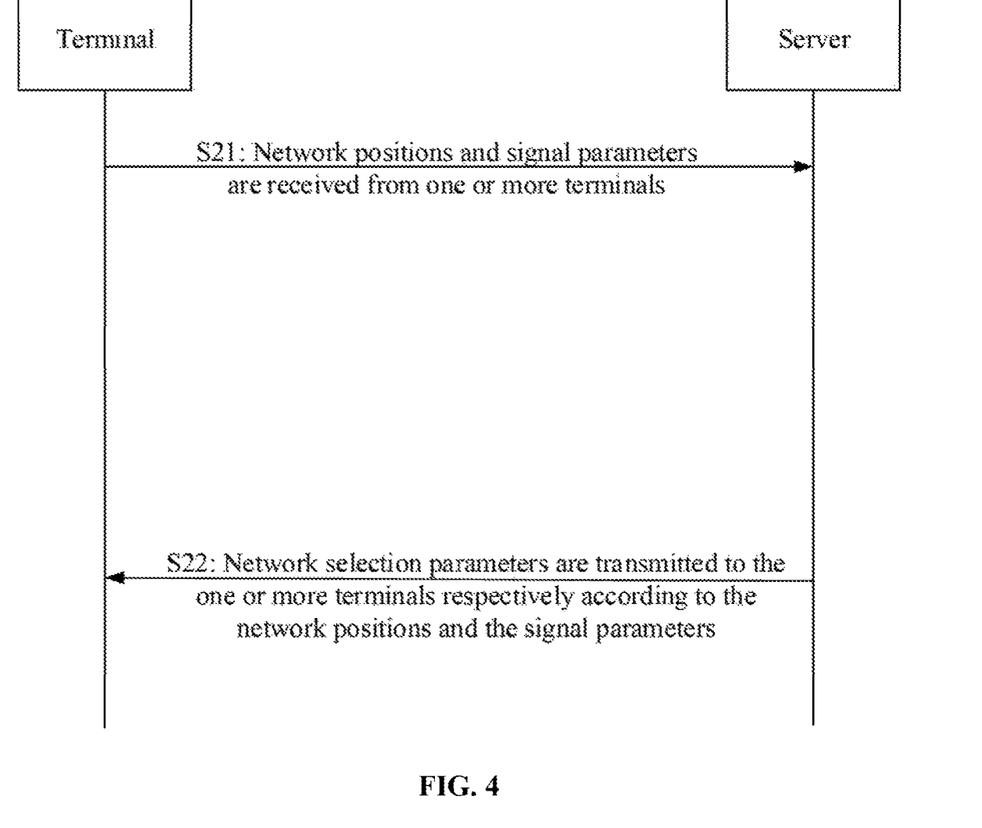
FIG. 4 is a flowchart showing a method for transmitting a network parameter according to an exemplary embodiment.

As shown in FIG. 4, an embodiment provides a method for transmitting a network selection parameter, which is applied to a server and includes the following operations.

In S21, network positions and signal parameters are received from one or more terminals.

In S22, network selection parameters are transmitted to the one or more terminals respectively according to the network positions and the signal parameters.

In the embodiment of the present application, the server may receive network positions and signal parameters reported by a great number of terminals to learn a signal condition corresponding to the signal parameter of each network position and transmit corresponding network selection parameters to the terminals at the network positions corresponding to the terminals, so that poor communication quality caused by selection of an unsuitable or non-optimal network when network selection is performed based on prior information obtained by historical residence may be upgraded. In addition, compared with network selection based on network measurement, this manner has the advantages that a latency required by network measurement may be reduced, a long network selection latency and the like may be reduced, the network selection rate may be increased, and it may be ensured that the selected terminal can provide communication quality satisfied by the terminal.

Figure 5:
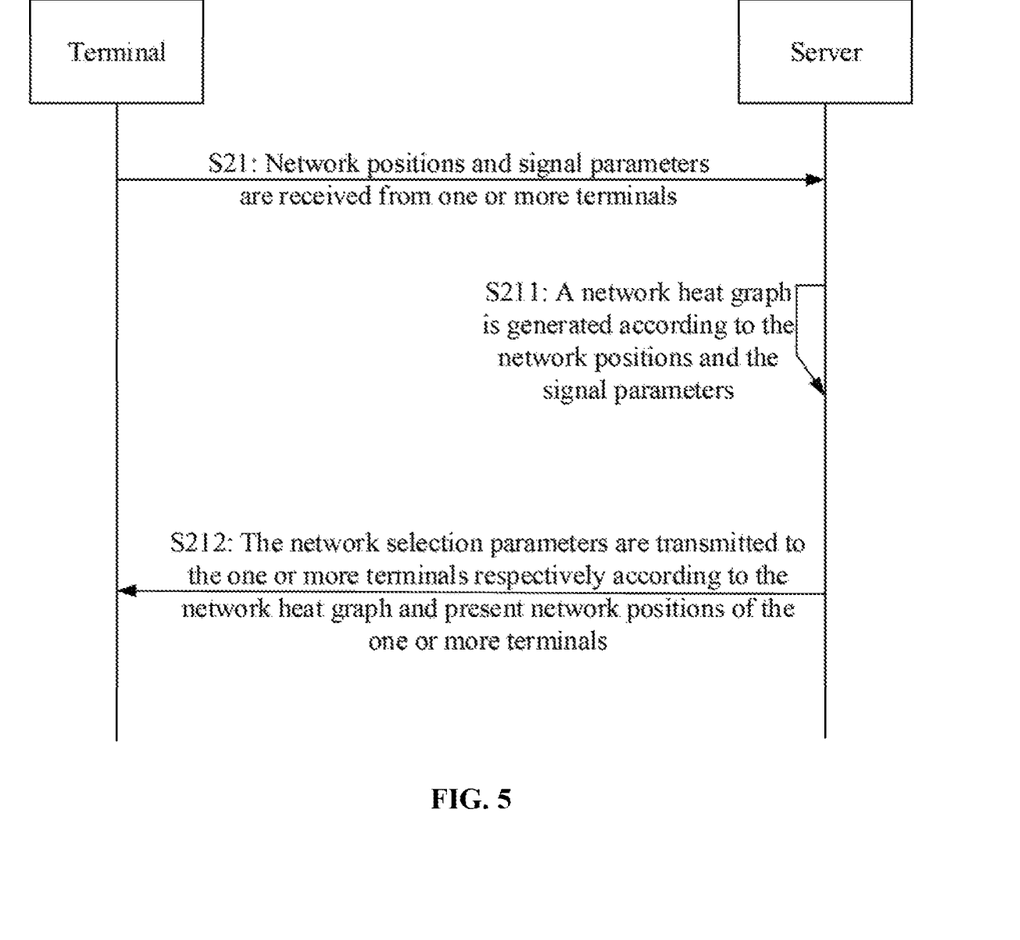
FIG. 5 is a flowchart showing a method for transmitting a network parameter according to an exemplary embodiment.

In some embodiments, as shown in FIG. 5, S21 may include the following operations. In S211, statistical signal values of different network positions are obtained according to the network positions and the signal parameters. In S212, a network heat graph is generated according to the statistical signal values. In S213, the network selection parameters are transmitted to the one or more terminals respectively according to the network heat graph and present network positions of the one or more terminals.

The network heat graph may be formed by information such as a distribution condition, determined based on the network positions and the signal parameters, of one or multiple types of networks and/or signal quality of first-type networks under the condition that such a network distribution is formed, and the like.

The network heat graph can reflect signal quality of the first-type networks at different positions. The server may provide the network selection parameters according to the network heat graph and in combination with the present positions of the terminals. The terminal may receive the network selection parameter from the server through various types of networks such as a Wireless Fidelity (WiFi) network and/or a cellular mobile communication network. The network parameter and the signal parameter may be configured to form the network heat graph. Therefore, the network heat graph may be a probability graph, drawn based on a map, of distribution and signal quality of the first-type networks.

In some other embodiments, S211 may include that the network parameters and signal parameters periodically reported by the terminals after first reporting are received. The terminal may periodically or aperiodically report network parameters and signal parameters, but the terminal may periodically report the network parameters and the signal parameters in the embodiments of the present application. Specifically, the terminal may periodically report network positions and signal parameters of the first-type networks.

In some other embodiments, S22 may include that the network selection parameters are periodically sent to the terminals according to the network heat graph.

The server may also periodically or aperiodically send the network selection parameters to the terminals. For example, the server may send the network selection parameter when a movement position of the terminal is greater than a movement threshold. In the embodiments of the present application, the server may periodically transmit the network selection parameter to the terminal for network selection for registration on a network. Compared with temporary receiving a network selection parameter, this manner has the advantage that the network registration latency of the terminal may be reduced.

According to the network selection method for a terminal in the embodiments of the present application, the terminal may report its present network position and the signal parameter to enable a server to transmit a network selection parameter to the terminal. In such a manner, the terminal, during network selection for registration, may not perform network selection only according to information such as prior information obtained by historical residence and/or present network measurement but perform network selection according to the network selection parameter received from the server, so that poor communication quality caused by selection of an unsuitable or non-optimal network when network selection is performed based on the prior information obtained by historical residence can be improved. In addition, compared with network selection based on network measurement, this manner has the advantages that a latency caused by network measurement can be reduced, a long network selection latency and the like thus can be lowered, and the speed of network selection can be increased. It can be ensured that the selected network can provide communication quality satisfied by the terminal.

Figure 6:
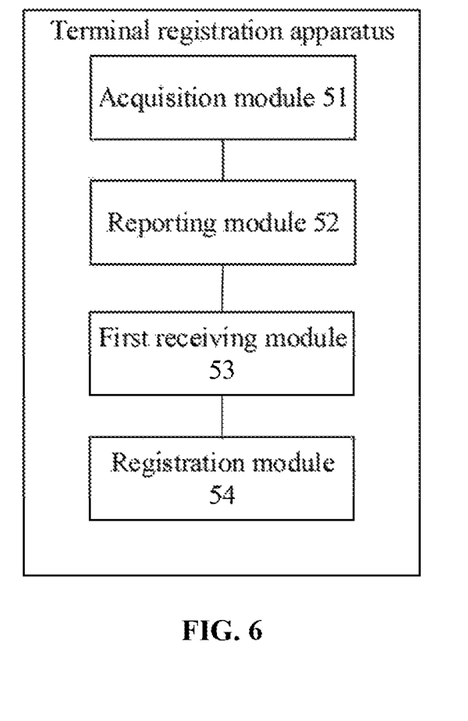
FIG. 6 is a block diagram of an apparatus for network registration according to an exemplary embodiment.

As shown in FIG. 6, an embodiment of the present application provides an apparatus for network registration, which is applied to a terminal and include an acquisition module 51 that is configured to acquire a signal parameter of a network position where the terminal is presently located, a reporting module 52 that is configured to report the network position and the signal parameter to a server, the network position and the signal parameter being configured to determine a network selection parameter, a first receiving module 53 that is configured to receive the network selection parameter from the server, and a registration module 54 that is configured to perform network registration according to the network selection parameter.

In some embodiments, all the acquisition module 51, the reporting module 52, the first receiving module 53, and the registration module 54 may be program modules, and the program modules may be executed by a processor to implement the operations of each module.

In some embodiments, all the acquisition module 51, the reporting module 52, the first receiving module 53, and the registration module 54 may be combined hardware and software modules. The combined hardware and software module may include, but not limited to, various programmable arrays. The programmable arrays may include, but not limited to, a complex programmable array or a field programmable array.

In some other embodiments, all the acquisition module 51, the reporting module 52, the first receiving module 53, and the registration module 54 may be pure hardware modules. The pure hardware module may include, but not limited to, an Application Specific Integrated Circuit (ASIC).

The registration module 54 can be configured to take the network selection parameter as prior information for network selection of the terminal and register on a selected network. In some embodiments, the registration module 54 can be specifically configured to, when the network selection parameter is taken as the prior information, configure a highest network selection priority for a target network indicated by the network selection parameter for network registration of the terminal.

In some embodiments, the apparatus may further include a determination module that is configured to determine whether to upload the network position of the terminal and the signal parameter to the server or not, and the acquisition module 51 is specifically configured to, in response to determining to upload the network position of the terminal and the signal parameter to the server, acquire the signal parameter of the network position where the terminal is presently located.

The apparatus may further include a searching module that is configured to, in response to determining to not upload the network position of the terminal and the signal parameter to the server, start network searching, and the registration module 54 is further configured to perform network registration based on found networks.

In some embodiments, the registration module 54 is specifically configured to select the network with a highest priority among the found networks for network registration.

In some embodiments, the operation that the signal parameter of the network position where the terminal is presently located is acquired may include that a signal parameter of a 5G network where the terminal is presently located is acquired. The operation that the network position and the signal parameter are reported to the server may include that a network position of the 5G network where the terminal is presently located and the signal parameter of the 5G network are reported to the server.

Figure 7:
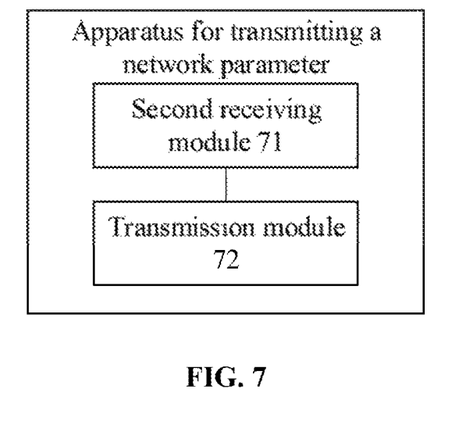
FIG. 7 is a block diagram of an apparatus for transmitting a network selection parameter according to an exemplary embodiment.

As shown in FIG. 7, an embodiment provides an apparatus for transmitting a network selection parameter, which is applied to a server and includes a second receiving module 71 that is configured to receive network positions and signal parameters from one or more terminals, and a transmission module 72 that is configured to transmit network selection parameters to the one or more terminals respectively according to the network positions and the signal parameters.

In some embodiments, both the second receiving module and the transmission module may be program modules, and the program modules may be executed by a processor to implement reception of the network parameters and the signal parameters, formation of a network heat graph of first-type networks and transmission of the network selection parameters.

Both the second receiving module and the transmission module may be combined hardware and software modules. The combined hardware and software module may include, but not limited to, various programmable arrays. The programmable arrays may include, but not limited to, a complex programmable array or a field programmable array. Further, both the second receiving module and the transmission module may be pure hardware modules, and the pure hardware module may include, but not limited to, an ASIC.

In some embodiments, the transmission module 72 is specifically configured to determine statistical signal values of different network positions according to the network positions and the signal parameters, generate a network heat graph according to the statistical signal values and transmit the network selection parameters to corresponding terminals according to the network heat graph and present network positions of the corresponding terminals.

With respect to the apparatus in any embodiment of the above embodiment, the specific manners for performing operations for individual modules therein have been described in detail in the embodiment regarding the method, which will not be elaborated herein.

Examples will be provided below in combination with any abovementioned embodiment.

Example 1

Since 5G operating companies do not achieve complete coverage of 5G networks under the present condition and the overall network deployment cost of the 5G networks is high, nationwide deployment of the 5G networks is a gradual coverage process. For a 5G mobile phone, the searching time cost of a NSA or SA network can be high, and the network is unstable. The embodiments aim to providing big data of communication about a signal parameter of a 5G network to assist the 5G mobile phone in rapidly selecting a suitable network for residence to reduce unnecessary network searching time and the number of networks with low residing quality, improve the network searching/residing quality of the 5G network and improve the user experience.

In the embodiments, statistics may be made on network parameters and quality indexes of a base station and a network where a mobile phone resides at a cloud through network parameters and network positions (having been masked) periodically uploaded by the mobile phone that has resided in the 5G network (NSA or SA) to form a 5G signal heat graph. The most suitable network parameter may be found through an algorithm (for example, a genetic algorithm) according to the signal parameter indexes of the 5G signal heat graph and sent back to the mobile phone, and a mobile phone side may receive and parse cloud data and optimize present network selection and residence and can be even switched to an optimal network in advance by taking network reference information of the cloud big data as prior information based on a present network condition of the mobile phone.

A cloud big data-based SA network selection logic may be that: based on the cloud big data, present optimal network parameters may be statistically aggregated, even a subsequent residing network condition can be judged in advance, and reference information of an appropriate network signal may be provided for the mobile phone to assist the mobile phone in network selection. A network selection algorithm may be that: the optimal network parameter is selected according to acquired network information and the network position, and even a subsequent network parameter is prejudged.

Example 2

Figure 8:
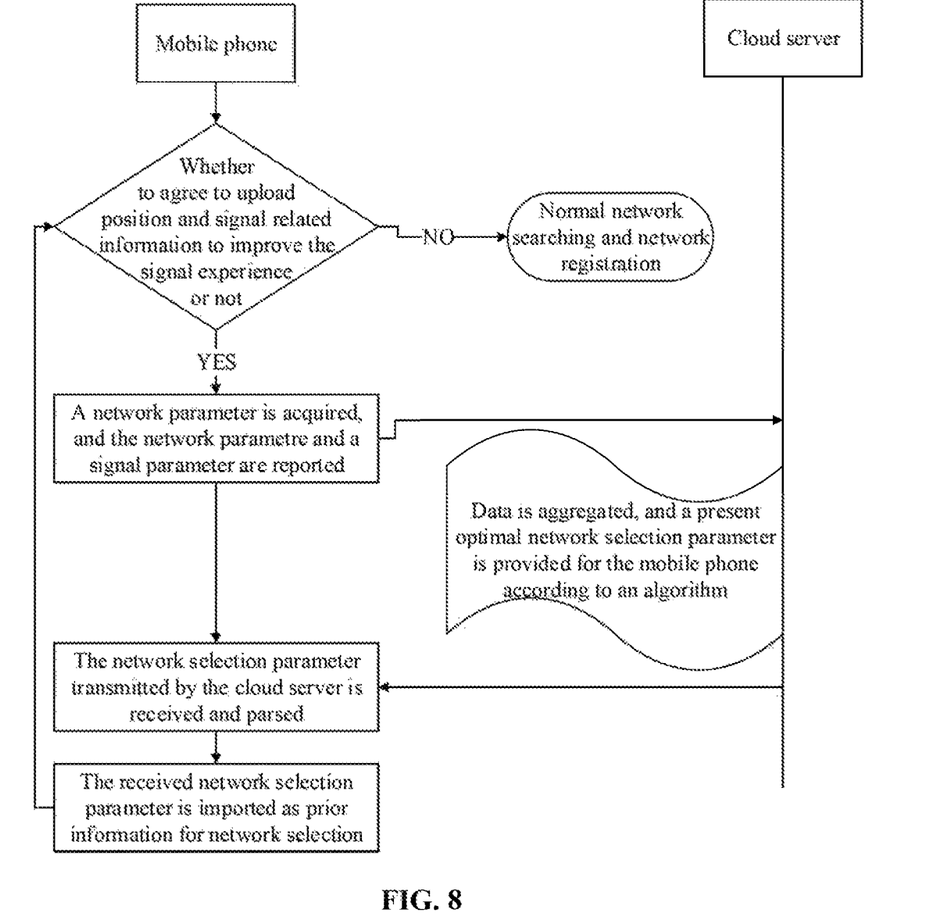
FIG. 8 is a flowchart showing a network registration method according to an exemplary embodiment.

Referring to FIG. 8, the example provides a network registration method, which includes the following operations. After a mobile phone is turned on, whether to agree to upload position and signal related information to improve a signal experience or not may be determined. If YES, a network parameter may be acquired, and the network parameter and a signal parameter may be reported. If NO, normal network searching and network registration may be executed.

A cloud server, after receiving network parameters and signal parameters reported by multiple terminals, may aggregate data and provide a present optimal network selection parameter for each corresponding mobile phone according to an algorithm. The mobile phone may receive and parse the network selection parameter transmitted by the cloud server. The received network selection parameter may be imported as prior information for network selection, and registration on a selected network may be performed. Referring to FIG. 8, the abovementioned flow is repeatedly executed.

An embodiment of the present application provides a communication device, which can include a transceiver, a processor, and a memory that is configured to store instructions executable by the processor. The processor is configured to execute the instructions to implement the network registration method provided in any abovementioned technical solution, for example, implementing the network registration method applied to a terminal or the method for transmitting a network parameter applied to a server. The processor can execute various instructions such as source codes or target codes to implement at least one of the methods in FIG. 1 to FIG. 3 and FIG. 6.

An embodiment of the present application provides a computer storage medium, which has stored instructions, the instructions being executed by a processor to implement the network registration method provided in any abovementioned technical solution, for example, implementing at least one of the methods shown in FIG. 1 to FIG. 3 and FIG. 6.

Figure 9:
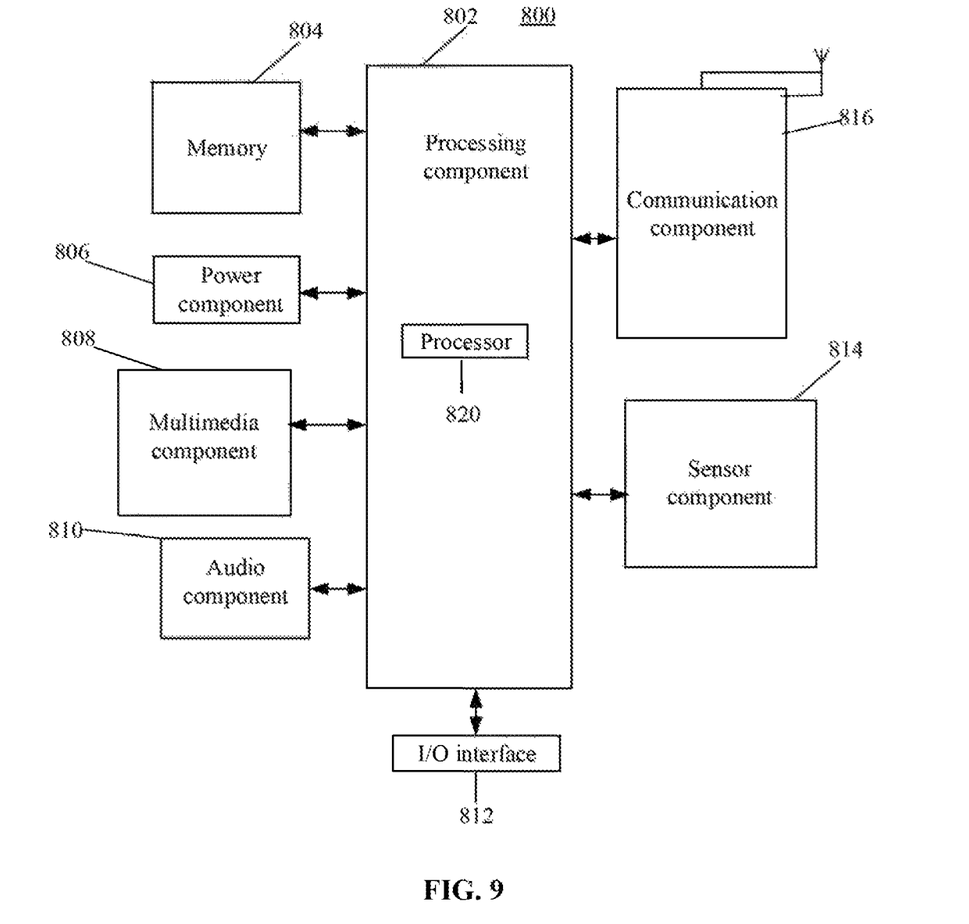
FIG. 9 is a block diagram of a terminal according to an exemplary embodiment.

FIG. 9 is a block diagram of a terminal 800 according to an exemplary embodiment. For example, the terminal 800 may be a mobile phone, a computer, a digital broadcast terminal, a messaging device, a gaming console, a tablet, a medical device, exercise equipment, a personal digital assistant, and the like.

Referring to FIG. 9, the terminal 800 may include one or more of the following components: a processing component 802, a memory 804, a power component 806, a multimedia component 808, an audio component 810, an Input/Output (I/O) interface 812, a sensor component 814, and a communication component 816.

The processing component 802 typically controls overall operations of the terminal 800, such as the operations associated with display, telephone calls, data communications, camera operations, and recording operations. The processing component 802 may include one or more processors 820 to execute instructions to perform all or part of the operations in the abovementioned method. Moreover, the processing component 802 may include one or more modules which facilitate interaction between the processing component 802 and the other components. For instance, the processing component 802 may include a multimedia module to facilitate interaction between the multimedia component 808 and the processing component 802.

The memory 804 is configured to store various types of data to support the operation of the device 800. Examples of such data include instructions for any application programs or methods operated on the terminal 800, contact data, phonebook data, messages, pictures, video, etc. The memory 804 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 806 provides power for various components of the terminal 800. The power component 806 may include a power management system, one or more power supplies, and other components associated with generation, management and distribution of power for the terminal 800.

The multimedia component 808 includes a screen providing an output interface between the terminal 800 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 808 includes a front camera and/or a rear camera. The front camera and/or the rear camera may receive external multimedia data when the device 800 is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 includes a Microphone (MIC), and the MIC is configured to receive an external audio signal when the terminal 800 is in the operation mode, such as a call mode, a recording mode and a voice recognition mode. The received audio signal may further be stored in the memory 804 or sent through the communication component 816. In some embodiments, the audio component 810 further includes a speaker configured to output the audio signal.

The I/O interface 812 provides an interface between the processing component 802 and a peripheral interface module, and the peripheral interface module may be a keyboard, a click wheel, a button and the like. The button may include, but not limited to a home button, a volume button, a starting button, and a locking button.

The sensor component 814 includes one or more sensors configured to provide status assessment in various aspects for the terminal 800. For instance, the sensor component 814 may detect an on/off status of the device 800 and relative positioning of components, such as a display and small keyboard of the terminal 800, and the sensor component 814 may further detect a change in a position of the terminal 800 or a component of the terminal 800, presence or absence of contact between the user and the terminal 800, orientation or acceleration/deceleration of the terminal 800 and a change in temperature of the terminal 800. The sensor component 814 may include a proximity sensor configured to detect presence of an object nearby without any physical contact. The sensor component 814 may also include a light sensor, such as a Complementary Metal Oxide Semiconductor (CMOS) or Charge Coupled Device (CCD) image sensor, configured for use in an imaging application. In some embodiments, the sensor component 814 may also include an acceleration sensor, a gyroscope sensor, a magnetic sensor, a pressure sensor or a temperature sensor.

The communication component 816 is configured to facilitate wired or wireless communication between the terminal 800 and another device. The terminal 800 may access a communication-standard-based wireless network, such as a WiFi network, a 2G or 3G network or a combination thereof. In an exemplary embodiment, the communication component 816 receives a broadcast signal or broadcast associated information from an external broadcast management system through a broadcast channel. In an exemplary embodiment, the communication component 816 further includes a Near Field Communication (NFC) module to facilitate short-range communication. For example, the NFC module may be implemented based on a Radio Frequency Identification (RFID) technology, an Infrared Data Association (IrDA) technology, an Ultra-Wide Band (UWB) technology, a Bluetooth (BT) technology, and another technology.

In an exemplary embodiment, the terminal 800 may be implemented by one or more ASICs, Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including instructions, such as the memory 804 including instructions. The instructions may be executed by the processor 820 of the terminal 800 to implement the abovementioned methods. For example, the non-transitory computer-readable storage medium may be a ROM, a Random Access Memory (RAM), a Compact Disc Read-Only Memory (CD-ROM), a magnetic tape, a floppy disc, an optical data storage device, and the like.

An embodiment of the present application provides a non-transitory computer-readable storage medium. The instructions in the storage medium may be executed by a processor of a mobile terminal to enable the mobile terminal to execute a network registration method, the method including that a signal parameter of a network position where the terminal is presently located is acquired, the network position and the signal parameter are reported to a server, the network position and the signal parameter being configured to determine a network selection parameter, the network selection parameter is received from the server, and network registration is performed according to the network selection parameter.

Furthermore, the operation that network registration is performed according to the network selection parameter may include that the network selection parameter is taken as prior information for network selection of the terminal, and registration on a selected network is performed.

The operation that the network selection parameter is taken as the prior information for network selection of the terminal may include that, when the network selection parameter is taken as the prior information, a highest network selection priority is configured for a target network indicated by the network selection parameter for network registration of the terminal.

The method may further include that whether to upload the network position of the terminal and the signal parameter to the server or not is determined. The operation that the signal parameter of the network position where the terminal is presently located is acquired may include that: in response to determining to upload the network position of the terminal and the signal parameter to the server, the signal parameter of the network position where the terminal is presently located is acquired.

Additionally, the method may further include that, in response to determining to not upload the network position of the terminal and the signal parameter to the server, network searching is started; and network registration is performed based on found networks.

The operation that network registration is performed based on the found networks may include that: a network with a highest priority among the found networks is selected for network registration. Further, the operation that the signal parameter of the network position where the terminal is presently located is acquired may include that a signal parameter of a 5G network where the terminal is presently located is acquired. The operation that the network position and the signal parameter are reported to the server may include that a network position of the 5G network where the terminal is located and the signal parameter are reported to the server.

An embodiment of the present application provides a non-transitory computer-readable storage medium. The instructions in the storage medium may be executed by a processor of a server to enable the server to execute a method for transmitting a network parameter. The method includes that network positions and signal parameters are received from one or more terminals, and network selection parameters are transmitted to the one or more terminals respectively according to the network positions and the signal parameters.

Furthermore, the operation that the network selection parameters are transmitted to the one or more terminals respectively according to the network positions and the signal parameters may include that a network heat graph is generated according to the network positions and the signal parameters, and the network selection parameters are transmitted to the one or more terminals respectively according to the network heat graph and present network positions of the one or more terminals.

Figure 10:
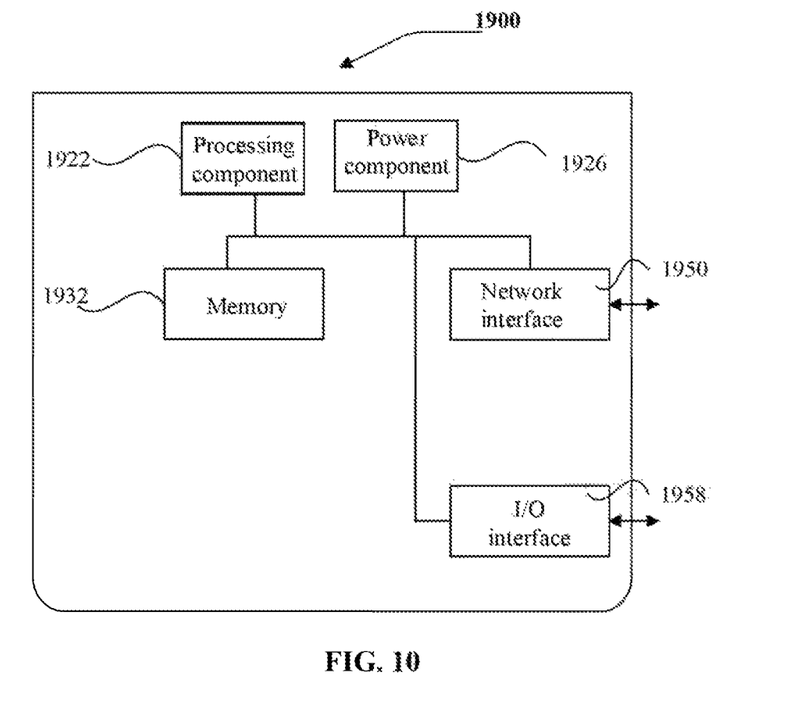
FIG. 10 is a block diagram of a server according to an exemplary embodiment.

FIG. 10 is a block diagram of a server 1900 according to an exemplary embodiment. For example, the server 1900 may be provided as a server. Referring to FIG. 10, the server 1900 includes a processing component 1922, further including one or more processors, and a memory resource represented by a memory 1932, configured to store instructions executable by the processing component 1922, for example, an application program. The application program stored in the memory 1932 may include one or more than one module of which each corresponds to a set of instructions. In addition, the processing component 1922 is configured to execute the instruction to execute the abovementioned method.

The server 1900 may further include a power component 1926 configured to execute power management of the server 1900, a wired or wireless network interface 1950 configured to connect the server 1900 to a network and an I/O interface 1958. The server 1900 may be operated based on an operating system stored in the memory 1932, for example, Windows Server™, Mac OS X™, Unix™, Linux™, FreeBSD™, or the like.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for network registration that is applied to a terminal, the method comprising:
   acquiring a signal parameter of a network position where the terminal is presently located;
   reporting the network position and the signal parameter to a server that determines a network selection parameter based on the network position and the signal parameter;
   receiving the network selection parameter from the server; and
   performing network registration according to the network selection parameter by configuring a highest network selection priority for a target network indicated by the network selection parameter for network registration of the terminal when the network selection parameter is taken as prior information.

2. The method of claim 1, further comprising:
   determining whether to upload the network position of the terminal and the signal parameter to the server,
   wherein acquiring the signal parameter of the network position where the terminal is presently located further comprises:
      acquiring the signal parameter of the network position where the terminal is presently located in response to determining to upload the network position of the terminal and the signal parameter to the server.

3. The method of claim 2, further comprising:
   starting network searching in response to determining to not upload the network position of the terminal and the signal parameter to the server; and
   performing network registration based on discovered networks.

4. The method of claim 3, wherein performing network registration based on the discovered networks further comprises:
   selecting a network with a highest priority among the discovered networks for network registration.

5. The method of claim 1, wherein
   acquiring the signal parameter of the network position where the terminal is presently located further comprises acquiring a signal parameter of a 5th generation (5G) network where the terminal is presently located; and reporting the network position and the signal parameter to the server further comprises reporting a network position of the 5G network where the terminal is presently located and the signal parameter of the 5G network to the server.

6. A non-transitory computer-readable storage medium, having stored instructions thereon that, when executed by a processor, implement the method of claim 1.

7. A method for transmitting a network selection parameter that is applied to a server, the method comprising:
receiving network positions and signal parameters from one or more terminals; and
transmitting network selection parameters to the one or more terminals respectively based on the network positions and the signal parameters,
wherein highest network selection priority is configured for target networks indicated by the network selection parameters for network registrations of the terminals when the network selection parameters are taken as prior information.

8. The method of claim 7, wherein transmitting the network selection parameters to the one or more terminals respectively based on the network positions and the signal parameters further comprises:
obtaining statistical signal values of different network positions according to the network positions and the signal parameters;
generating a network heat graph according to the statistical signal values; and
transmitting the network selection parameters to the one or more terminals respectively based on the network heat graph and present network positions of the one or more terminals.

9. A non-transitory computer-readable storage medium, having stored instructions thereon that, when executed by a processor, implement the method of claim 7.

10. A communication device that is implemented by a terminal, the communication device comprising:
a transceiver;
a processor; and
a memory that is configured to store instructions executable by the processor,
wherein the processor is connected with the transceiver and the memory respectively and is configured to:
acquire a signal parameter of a network position where the terminal is presently located;
report the network position and the signal parameter to a server that determines a network selection parameter based on the network position and the signal parameter;
receive the network selection parameter from the server; and
perform network registration according to the network selection parameter by configuring a highest network selection priority for a target network indicated by the network selection parameter for network registration of the terminal when the network selection parameter is taken as prior information.

11. The communication device of claim 10, wherein the processor is further configured to:
determine whether to upload the network position of the terminal and the signal parameter to the server; and
acquire the signal parameter of the network position where the terminal is presently located in response to determining to upload the network position of the terminal and the signal parameter to the server.

12. The communication device of claim 11, wherein the processor is further configured to:
start network searching in response to determining to not upload the network position of the terminal and the signal parameter to the server; and
perform network registration based on discovered networks.

13. The communication device of claim 12, wherein the processor is further configured to select a network with a highest priority among the discovered networks for network registration.

14. The communication device of claim 10, wherein
acquiring the signal parameter of the network position where the terminal is presently located further comprises acquiring a signal parameter of a 5th generation (5G) network where the terminal is presently located; and
reporting the network position and the signal parameter to the server further comprises reporting a network position of the 5G network where the terminal is presently located and the signal parameter of the 5G network to the server.

15. A communication device that is implemented by a server, the communication device comprising:
a transceiver;
a processor; and
a memory that is configured to store instructions executable by the processor,
wherein the processor is connected with the transceiver and the memory respectively and is configured to execute the instructions to implement the method of claim 8.

16. The communication device of claim 15, wherein the processor is further configured to:
obtain statistical signal values of different network positions according to the network positions and the signal parameters;
generate a network heat graph according to the statistical signal values; and
transmit the network selection parameters to the one or more terminals respectively according to the network heat graph and present network positions of the one or more terminals.

* * * * *